(12) United States Patent
Boehm et al.

(10) Patent No.: US 8,989,933 B2
(45) Date of Patent: Mar. 24, 2015

(54) METHOD FOR MONITORING THE CONDITIONS OF DRIVING SYSTEMS, BATTERY COMPRISING A MODULE FOR CONDITION MONITORING, AND A MOTOR VEHICLE COMPRISING A CORRESPONDING BATTERY

(75) Inventors: Andre Boehm, Kornwestheim (DE); Stefan Wickert, Albershausen (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 13/810,383

(22) PCT Filed: May 20, 2011

(86) PCT No.: PCT/EP2011/058228
§ 371 (c)(1),
(2), (4) Date: May 1, 2013

(87) PCT Pub. No.: WO2012/010345
PCT Pub. Date: Jan. 26, 2012

(65) Prior Publication Data
US 2013/0218384 A1      Aug. 22, 2013

(30) Foreign Application Priority Data
Jul. 20, 2010   (DE) .................... 10 2010 031 545

(51) Int. Cl.
*B60W 20/00*      (2006.01)
*B60W 10/06*      (2006.01)
(Continued)

(52) U.S. Cl.
CPC ............. *B60W 20/108* (2013.01); *B60W 10/06* (2013.01); *B60W 10/08* (2013.01); *B60W 10/26* (2013.01); *B60W 30/188* (2013.01); *B60W 20/00* (2013.01);
(Continued)

(58) Field of Classification Search
USPC .................... 701/22; 903/930, 903, 917, 947; 180/65.275, 65.285; 477/3, 2, 7
See application file for complete search history.

(56) References Cited

U.S. PATENT DOCUMENTS

| 6,879,888 B2 * | 4/2005 | Ochiai et al. .................... 701/22 |
| 7,520,353 B2 * | 4/2009 | Severinsky et al. ........ 180/65.28 |
| 2003/0217876 A1 * | 11/2003 | Severinsky et al. .......... 180/65.2 |

FOREIGN PATENT DOCUMENTS

| DE | 43 44 053 A1 | 7/1994 |
| DE | 10 2005 040 783 A1 | 3/2007 |

(Continued)

OTHER PUBLICATIONS

International Search Report corresponding to PCT Application No. PCT/EP2011/058228, mailed Aug. 12, 2011 (German and English language document) (8 pages).

*Primary Examiner* — Marthe Marc-Coleman
(74) *Attorney, Agent, or Firm* — Maginot, Moore & Beck LLP

(57) ABSTRACT

A method for monitoring the conditions of driving systems can be used in particular to control driving systems in hybrid vehicles with particular consideration given to the exhaust emission. The method monitors the conditions of driving systems that comprise an internal combustion engine and an electric motor with an energy source. A first power value for operating the internal combustion engine and a second power value for describing the power that can be provided by the energy source are ascertained, and the first and second power values are compared with each other to monitor the conditions of the driving system. The driving system is controlled dependent on the result of the comparison.

10 Claims, 1 Drawing Sheet

(51) Int. Cl.
*B60W 10/08* (2006.01)
*B60W 10/26* (2006.01)
*B60W 30/188* (2012.01)

(52) U.S. Cl.
CPC . *Y02T 10/54* (2013.01); *Y02T 10/56* (2013.01); *Y02T 10/6286* (2013.01); *Y10S 903/93* (2013.01)
USPC ............................................ 701/22; 903/930

(56) References Cited

FOREIGN PATENT DOCUMENTS

| | | | |
|---|---|---|---|
| DE | 10 2006 019 031 A1 | 10/2007 | |
| DE | 10 2006 044 427 A1 | 4/2008 | |
| EP | DE 4344053 | * 7/1994 | ............... B60K 6/04 |

* cited by examiner

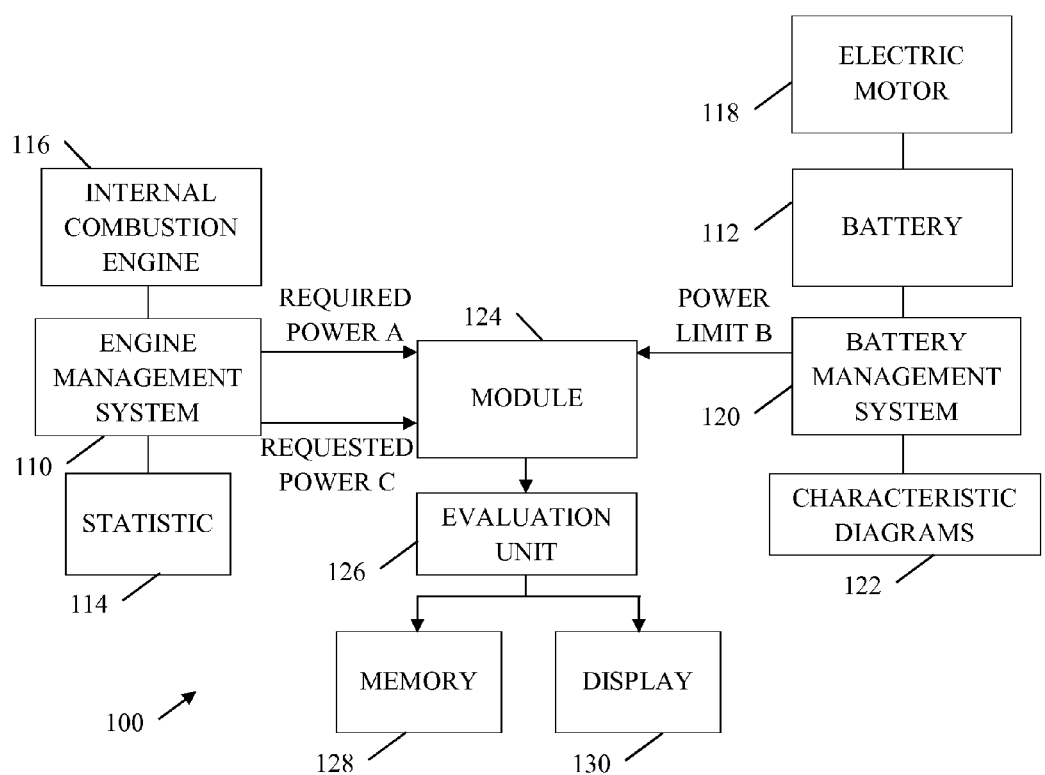

METHOD FOR MONITORING THE CONDITIONS OF DRIVING SYSTEMS, BATTERY COMPRISING A MODULE FOR CONDITION MONITORING, AND A MOTOR VEHICLE COMPRISING A CORRESPONDING BATTERY

This application is a 35 U.S.C. §371 National Stage Application of PCT/EP2011/058228, filed on May 20, 2011, which claims the benefit of priority to Serial No. DE 10 2010 031 545.1, filed on Jul. 20, 2010 in Germany, the disclosures of which are incorporated herein by reference in their entirety.

The present disclosure relates to a method for monitoring the state of drive systems, a battery comprising a module for state monitoring and a motor vehicle comprising a corresponding battery which can be used, in particular, to control drive systems in hybrid vehicles, particularly taking into account exhaust gas emissions.

BACKGROUND

Hybrid vehicles combine various types of drive, for example internal combustion engines and electric motors. In this context, the types of drive complement one another and compensate one anothers' drawbacks. One drawback of internal combustion engines are their exhaust gases. These are legally limited and have to be monitored during the driving mode. This monitoring is usually carried out, for example, by onboard diagnostics (OBD).

Exhaust gases of internal combustion engines are bad, in particular, in the case of dynamic operation, that is to say in the case of rapid load changes or strong acceleration, that is to say a high load. This is attenuated by the use of an electric motor. The electric motor and the associated battery therefore have a direct influence on the exhaust gas emissions of the vehicle and therefore also have to be monitored. The monitoring limit is defined here in such a way that it is signalled when the exhaust gases have worsened by a predefined factor with respect to a defined test cycle. With respect to the battery or the battery system, such states cannot be determined and there are no known conventional solutions known which monitor the state of the battery in conjunction with the exhaust gas emissions.

Laid-open patent application DE 10 2005 040 783 A1 discloses a method for controlling a vehicle drive unit, wherein the drive unit comprises at least two individual motors. According to the solution described in DE 10 2005 040 783 A1, a total actual torque is calculated from the individual actual torques of the at least two individual motors and compared with a permissible total torque.

SUMMARY

According to the disclosure, a method for monitoring the state of drive systems, in particular of drive systems in hybrid vehicles is therefore made available. A drive system comprises here at least one internal combustion engine and at least one electric motor. The at least one electric motor is connected or can be connected to at least one battery or else some other electric storage means or generator, for example Powercaps or fuel cells, as an energy source. The battery is preferably a traction battery. According to the disclosure, at least one first power value is determined for operating the at least one internal combustion engine. Furthermore, according to the present disclosure at least one second power value is determined which indicates what power the at least one battery has to make available. A preferred embodiment provides that the at least one first power value is determined by an energy management system and/or the at least one second power value is determined by a battery management system. According to the disclosure there is also provision that the at least one first and the at least one second power value are compared in order to monitor the state of the drive system, and that the drive system is controlled as a function of the comparison result.

In the comparison of the at least one first power value with the at least one second power value, the at least one first power value may be the power value which is calculated in advance or a power value which is actually requested by the engine management system during the driving mode.

In one preferred embodiment there is provision that the exhaust gases expelled by the internal combustion engine are taken into account in the determination of the at least one first power value. In particular, the at least one first power value is determined as the power value which ensures that the legally prescribed values for the exhaust gas emissions are not exceeded. The at least one first power value is then that power value which indicates what power has to be made available by the at least one battery in order to implement the desired (total) engine power.

Another aspect of the present disclosure is to take measures if the comparison of the power values reveals that the power which can be made available by the battery is not sufficient to implement the desired (total) engine power, that is to say if the at least one first power value is higher than the at least one second power value. In one preferred embodiment of the disclosure, in such a case there is provision that the power of the at least one internal combustion engine is reduced and/or the quantity of the expelled exhaust gases, in particular the quantity of the exhaust gases which is additionally expelled as a result of the reduced assistance provided to the internal combustion engine by the at least one electric motor, is determined. Additionally or alternatively, in one preferred embodiment there is provision that the fault event is stored and/or it is signalled to the driver that the necessary energy cannot be made available by the battery. It proves advantageous if the signalling is carried out as a function of the number of stored fault events. In one preferred embodiment, there is provision for this purpose that a counter is decremented if the comparison reveals that the at least one first power value is higher than the at least one second power value. It proves advantageous that the counter is incremented as a function of the additionally generated exhaust gases. It is also advantageous if the counter is decremented if the exhaust gas limits are complied with or undershot.

One preferred embodiment of the disclosure provides that the exhaust gas emissions are determined with respect to a predefined driving cycle (test cycle). It proves advantageous if the determined exhaust gas quantity which is additionally expelled as a result of reduced provision of power by the at least one battery is weighted with the values which describe the operating state of the at least one internal combustion engine, for example the engine temperature, load, rotation speed or the like, in order to bring about the reference to the driving cycle.

It also proves advantageous if the at least one first power value and/or the at least one second power value are determined for at least two different time periods. One preferred embodiment provides, for example, that a power value is determined for a brief time period in order, for example, to permit rapid load changes, and that a power value is determined for a relatively long time period in order, for example, to assist the internal combustion engine by means of the at least one electric motor in the event of relatively long acceleration.

Another important aspect of the disclosure is that the at least one first power value is determined by evaluating a statistic. The statistic preferably relates to a, for example, legally prescribed driving cycle. The quantity of the exhaust gases can be retrieved in the statistic as a function of prescribable parameters. For example the engine temperature, load, rotational speed or the like of the at least one internal combustion engine can be provided as such parameters.

In one preferred embodiment of the disclosure, there is provision that various situations relating to the assistance of the at least one internal combustion engine by the at least one electric motor are taken into account in the statistic. It is possible to provide, for example, that the exhaust gas values of the statistic are determined,
- by the at least one internal combustion engine being operated with assistance by the at least one electric motor,
- by the at least one internal combustion engine being operated without assistance by the at least one electric motor and without a reduction in the power, and/or
- by the at least one internal combustion engine being operated with assistance by the at least one electric motor, wherein the at least one electric motor only makes available reduced power.

The statistic for the operation of the at least one electric motor which is assisted by at least one electric motor with a reduced performance can be produced by simulating the reduced performance of the at least one electric motor. During the simulation, the reduced performance can be simulated as a function of the state of charge and/or the requested power. Another preferred embodiment provides that, in order to produce this statistic, a real battery with reduced performance is used, wherein the power parameters are known to the battery management system.

A further aspect of the disclosure relates to a battery having a module for monitoring the state of drive systems, wherein the module is configured in such a way that a method for monitoring the state of drive systems can be carried out, wherein at least one first power value for operating the at least one internal combustion engine and at least one second power value for describing the power which can be made available by the at least one battery are determined, and in order to monitor the state of the drive system the at least one first and the at least one second power value are compared with one another and the drive system is controlled as a function of the result of the comparison. The battery is preferably a lithium-ion battery, or the battery comprises electrochemical cells which are embodied as lithium-ion battery cells.

Another aspect of the disclosure relates to a motor vehicle having an electric drive motor and having at least one internal combustion engine for driving the motor vehicle and a battery which is connected or can be connected to the electric drive motor, according to the aspect of the disclosure described in the preceding paragraph. However, the battery is not restricted to such a purpose of use but rather can also be used in other electric systems.

One particular advantage of the disclosure is that a simple method is made available with which in a hybrid system the battery of the electric motor is monitored with respect to its influence on the exhaust gas emission of the vehicle.

A further advantage of the disclosure is the decoupling of the management system for the internal combustion engine from the battery management system.

Advantageous developments of the disclosure are described in the description below.

BRIEF DESCRIPTION OF THE DRAWINGS

Exemplary embodiments of the disclosure are explained in more detail with reference to the drawing and the following description. In the drawing:

The FIGURE shows a schematic illustration of an exemplary embodiment of the invention with reference to a block circuit diagram.

DETAILED DESCRIPTION

The disclosure will be described in more detail below with reference to a hybrid drive of a motor vehicle. The exemplary hybrid drive comprises here an internal combustion engine 116 and an electric motor 118. However, the disclosure is not restricted to the control of such a hybrid motor but instead also comprises further drive systems such as, for example drive systems with a plurality of internal combustion engines and/or electric motors or drive systems for other devices. Instead of the battery, a Supercap or a fuel cell can also be used.

The FIGURE illustrates the components of a drive system 100 according to an exemplary embodiment of the invention.

In this context, an engine management system 110 calculates the (first) power values A which have to be at least made available by the battery system 120 in order to avoid infringing the exhaust gas limiting values.

The power values A which are calculated in the engine management system 110 have to be referred to a driving cycle which is relevant for the legal regulations. For this purpose, an exemplary embodiment provides that in the driving cycle a statistic 114 is produced in which the exhaust gases of the internal combustion engine 116 are represented as a function of the engine temperature, load and rotation speed.

The statistic 114 represents three different situations in one exemplary embodiment:
- determination of exhaust gas emissions during operation of the internal combustion engine 116 with assistance by the electric motor 118,
- determination of the exhaust gas emissions during operation of the internal combustion engine 116 without assistance by the electric motor 118 and without a reduction in power, and
- determination of the exhaust gas emissions during operation of the internal combustion engine 116 with assistance by the electric motor 118, wherein the power of the electric motor 118 is restricted.

In the case mentioned last, the restriction of the power of the battery 112 can be simulated by an artificial reduction as a function of the state of charge of the battery 112 and the requested power. As an alternative to this, a real damaged battery 112 can be used. Particularly informative statistics 114 are obtained if a damaged battery 112 is used whose power limits are known to the battery management system 120. On the basis of these statistics 114, the power limits A beyond which assistance by the electric motor 118 becomes necessary can be defined as a function of the engine temperature, load and rotational speed.

The (second) power values B which are the maximum which can be provided by the battery 112 are in turn calculated by the battery management system 120.

The limits for the power values B of the battery 112 which can be output in the respective state of the battery 112 are also represented in the exemplary embodiment by characteristic diagrams 122, wherein the limits for the power values B are specified as a function of the state of charge SOC of the battery 112 and of the operating temperature.

The power values A and B can be divided here, for example into a power which can be retrieved for a defined short time period in order to smooth out sudden changes in load, and into a power which can be retrieved for a longer time, in order to supplement the power of the internal combustion engine 116 in the case of lower exhaust gas values in acceleration phases.

In a module 124 for comparing the two power values A and B, it is tested whether the power which can be supplied by the battery 112 is sufficient to assist the internal combustion engine 116. If the battery 112 is not able to make available the requested power, that is to say in the case of B<A, the engine management system 110 can react to this by either providing a reduction in power, in order to keep the exhaust gas emission within the limiting values, or by storing the fault event in a memory unit 128. Of course, both reactions may be provided.

If this fault event occurs frequently (debouncing), which is determined in an evaluation unit (126), this is an indication that the battery system is defective. In this case, the driver will be alerted to this by a display 130.

As an alternative to the power values A which are calculated in advance and stored in the statistics 114, the power value B can also be compared during the driving mode with the power values C which are being currently requested by the engine management system 110, in order to assess the state of the battery. If the battery cannot provide this power value C, in one exemplary embodiment it is calculated how much additional exhaust gas is generated. Recourse is preferably made to existing emission models for this purpose. In order to place the determined exhaust gas quantity in relationship with the test cycle, the determined exhaust gas quantity is weighted with the values which have occurred for the engine temperature, load and/or rotation speed.

In another exemplary embodiment, there is provision that a counter is incremented as a function of the level of the additionally expelled exhaust gases. If the exhaust gas limits are complied with or undershot, in one exemplary embodiment the counter value is decremented. If the counter reaches a threshold value, a fault memory entry is made. There is also provision that in the case of repeated fault entries, signalling occurs, for example by informing the driver, since such repeated fault entries indicate a damaged or aged battery 112.

The disclosure is not restricted in its embodiment to the preferred exemplary embodiments disclosed above. Instead, a number of variants are conceivable which make use of the method according to the disclosure, the battery according to the disclosure and the motor vehicle according to the disclosure, even in embodiments which are of a fundamentally different type.

The invention claimed is:

1. A method for monitoring the state of a drive system, having at least one internal combustion engine and at least one electric motor with at least one energy source, comprising:
determining at least one first power value which has to be provided by the at least one energy source to operate the at least one internal combustion engine, wherein determining the at least one first power value includes considering exhaust gas values of the at least one internal combustion engine;
determining at least one second power value to describe power which the at least one energy source is able to make available;
comparing the at least one first power value and the at least one second power value with one another to monitor the state of the drive system; and
controlling the drive system as a function of a result of the comparison.

2. The method as claimed in claim 1, further comprising, when the at least one second power value is lower than the at least one first power value, at least one of:
reducing the power of the at least one internal combustion engine,
determining emitted exhaust gases,
storing the at least one first power value and at least one second power value, and
transmitting a signal.

3. The method as claimed in claim 1, wherein at least one of the at least one first power value and the at least one second power value relates to different time periods of power provision.

4. The method as claimed in claim 1, wherein determining the at least one first power value further includes considering a statistic.

5. The method as claimed in claim 4, wherein the statistic is produced by evaluating a drive system with various degrees of support of the at least one internal combustion engine by the at least one electric motor.

6. The method as claimed in claim 1, wherein the at least one second power value is one of a calculated power value and a power value which is currently requested by an engine management system.

7. The method claim 1, wherein the first power level is a power level to be provided by the at least one energy source to the at least one the electric motor such that the internal combustion engine operates at or below a predetermined exhaust gas value threshold.

8. A drive system comprising:
an internal combustion engine;
an electric motor;
a battery configured to power the electric motor; and
a module configured to:
determine at least one first power value which has to be provided by the battery to the electric motor in order to operate the at least one internal combustion engine based at least in part upon a consideration of exhaust gas values of the at least one internal combustion engine,
determine at least one second power value to describe power which the battery is able to make available,
compare the at least one first power value and the at least one second power value to monitor a state of a drive system, and
control the drive system as a function of a result of the comparison.

9. The drive system as claimed in claim 8, the battery further comprising lithium-ion battery cells.

10. A motor vehicle comprising:
at least one electric motor;
at least one internal combustion engine configured to drive the motor vehicle; and
a battery configured to be connected to the at least one electric motor, wherein the battery includes a module configured to:
determine at least one first power value which has to be provided by the battery for driving the electric motor to operate the at least one internal combustion engine based at least in part upon a consideration of exhaust gas values of the at least one internal combustion engine,
determine at least one second power value to describe power which at least one energy source is able to make available, compare the at least one first power value and the at least one second power value to monitor a state of a drive system, and control the drive system as a function of a result of the comparison.

\* \* \* \* \*